United States Patent
Suzuki

(10) Patent No.: US 6,732,601 B2
(45) Date of Patent: May 11, 2004

(54) CONTROL APPARATUS OF AN AUTOMATED MANUAL TRANSMISSION

(75) Inventor: Hosei Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/986,719

(22) Filed: Nov. 9, 2001

(65) Prior Publication Data

US 2002/0056331 A1 May 16, 2002

(30) Foreign Application Priority Data

Nov. 13, 2000 (JP) ........................................ 2000-344899

(51) Int. Cl.[7] ............................. F16H 59/00; F16H 61/16
(52) U.S. Cl. ................... 74/336 R; 74/732.1; 192/3.58; 192/3.61; 192/219
(58) Field of Search ............................... 74/335, 336 R, 74/732.1, 733.1; 474/74; 192/3.58, 3.61, 219, 221, 220.2

(56) References Cited

U.S. PATENT DOCUMENTS

| | | | | | |
|---|---|---|---|---|---|
| 4,463,622 A | * | 8/1984 | Freiburger | ................. | 74/337.5 |
| 4,474,074 A | * | 10/1984 | Nakao et al. | ................. | 74/462 |
| 4,616,521 A | * | 10/1986 | Akashi et al. | ................ | 74/335 |
| 4,627,312 A | * | 12/1986 | Fujieda et al. | ............ | 74/336 R |
| 5,016,488 A | * | 5/1991 | Goates | ..................... | 74/473.28 |
| 5,031,737 A | * | 7/1991 | Dzioba et al. | ........... | 192/220.2 |
| 5,193,417 A | * | 3/1993 | Niiyama et al. | .............. | 74/335 |
| 5,983,741 A | * | 11/1999 | Warwick et al. | ............. | 74/339 |
| 5,992,255 A | * | 11/1999 | Fujita et al. | ................. | 74/335 |
| 6,550,352 B2 | * | 4/2003 | Okada et al. | ................. | 74/335 |
| 6,561,052 B2 | * | 5/2003 | Kayano et al. | ............... | 74/339 |

FOREIGN PATENT DOCUMENTS

| | | |
|---|---|---|
| JP | 2703169 | 10/1997 |
| JP | 2873690 | 1/1999 |

* cited by examiner

*Primary Examiner*—Rodney H. Bonck
*Assistant Examiner*—Dennis Abdelnour
(74) *Attorney, Agent, or Firm*—McGinn & Gibb, PLLC

(57) ABSTRACT

A control apparatus of an automated manual transmission includes an input shaft provided with a plurality of drive gears, an output shaft provided with a plurality of driven gears engaged with the drive gears, and a reverse idler gear engaging with gears for backward movement respectively provided at the input and output sides when a backward moving stage is selected, as a mechanism for backward moving. Further, there is provided with a bypass clutch capable of selectively transmitting or shutting a power of the input shaft to the output shaft. When the backward moving stage is selected (S1), the bypass clutch is engaged (S3) so as to stop a rotation of the input shaft (S4), and thereafter, the reverse idler gear and the backward moving gears are engaged with each other (S5). Thus, a shift operation to a reverse mode can be securely and smoothly executed for a short time.

17 Claims, 3 Drawing Sheets

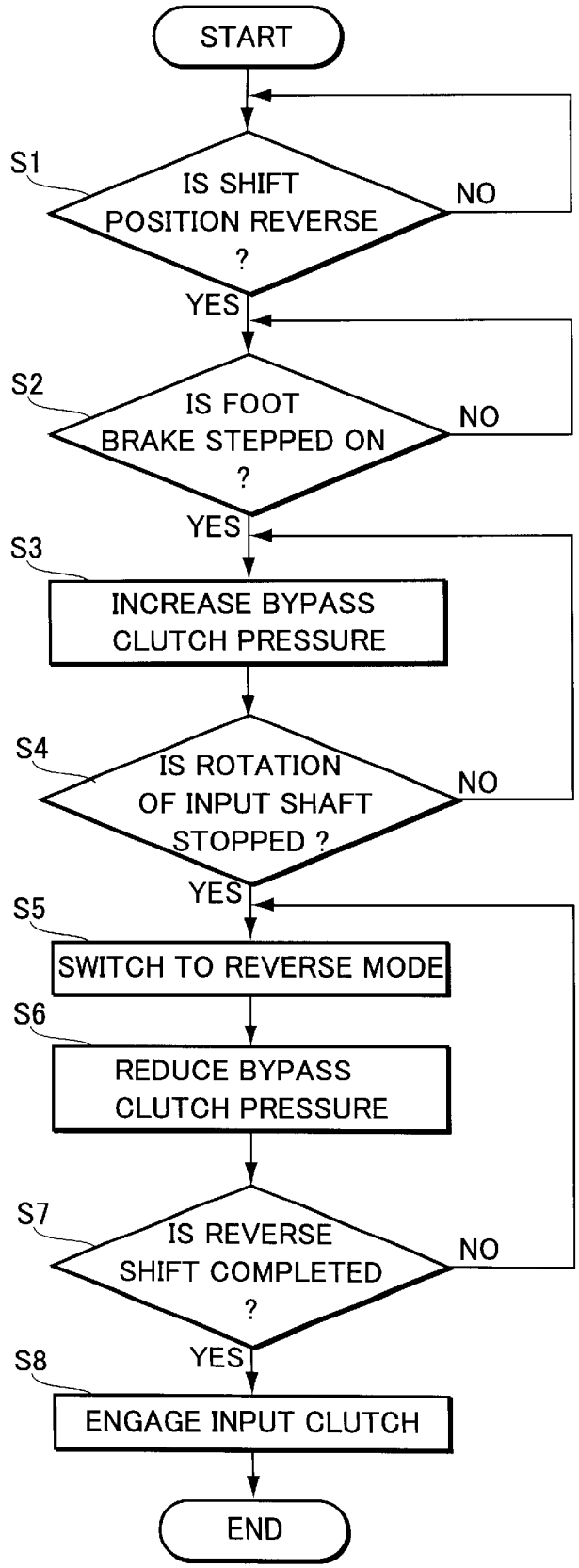

CONTROL APPARATUS OF AN AUTOMATED MANUAL TRANSMISSION

BACKGROUND OF THE INVENTION

The present invention relates to a control apparatus of an automated transmission mounted on a motor vehicle, and more particularly to a technique applied to the automated transmission having a plurality of transmission gear trains.

A manual type transmission (MT) executing a gear change operation by a manual operation of a driver includes an input shaft connected to an engine and to which a plurality of drive gears are attached, and an output shaft connected to a drive wheel and to which a plurality of driven gears forming pairs together with the drive gears are attached, in which a plurality of transmission gear trains are provided between the input and output shafts. In the MT, a gear change operation, i.e., a shift change is performed by manually switching a switching mechanism such as a synchromeshed mechanism for switching a gear train, that is, a gear pair among a plurality of transmission gear trains after disengaging a clutch at a time of changing gear, thereafter connecting the clutch.

When automatically executing the shift change and the clutch operation by a hydraulic actuator, it is possible to obtain an automated manual transmission based on a structure of a manual type transmission. This type of automated manual transmission has an advantage that a number of the parts can be reduced in comparison with a normal torque converter type automatic transmission (AT) having a planetary gear in an automatic gear change mechanism so as to make it easy to lighten, and an advantages that a power transmitting efficiency of a drive system is higher than that of the automatic transmission of the normal torque converter type.

As this type of automated manual transmission (hereinafter, simply referred to as AMT) having a plurality of transmission gear trains, there is a structure having a main clutch provided between a crankshaft and an input shaft and switching thereof from a engaged condition to a disengaged condition, and vice versa, a hydraulic bypass clutch of a multi-disc type for preventing a torque disconnection from the input shaft to the output shaft at a time of the gear change operation. For example, such an AMT is disclosed in Japanese Patent No.2703169, and an operation of the clutch in the manual type transmission is automated by a hydraulically driven actuator.

In the AMT, the structure is made such that one gear pair executing a power transmission is suitably switched by the synchromesh mechanism, and the engaged gear pair are switched while transmitting the torque from the input shaft to the output shaft by switching the bypass clutch to connection state at the time of changing gear, thereby intending to prevent the torque disconnection at the time of the gear change operation.

On the other hand, the gear pair is also switched in the case of backward moving of the vehicle. When the driver operates a select lever to select a backward moving stage (a reverse range: R), the gears at the input shaft and the output shaft are engaged with each other via a reverse idler gear, so that the output shaft is rotated in a reverse direction at the time of the normal traveling. A method of connecting the reverse idler gear includes a method of connecting the gears by the synchromesh mechanism provided at the input shaft or the output shaft in the same manner as that of the forward moving stage and a selectively sliding method of moving the reverse idler gear in an axial direction so as to engage with both of the gears. Further, in Japanese Patent No. 2703169 mentioned above, there are shown a structure in which the reverse idler gear is initially engaged with the gears for reverse rotation in the input and output shafts so as to connect the gear for reverse rotation in the output shaft to the output shaft by using the synchromesh mechanism, and a structure in which both of the synchromesh mechanism and the selectively sliding type are used.

In this case, in the AMT mentioned above, when using a wet type clutch for the main clutch, the input shaft rotates in a forward moving direction due to a drag torque of the wet type clutch even when making the clutch in a disconnection state. Accordingly, in the case that the selectively sliding type mentioned above is employed for the reverse gear train, and a reverse gear is selected from a neutral gear or a forward moving stage, there are problems that the gear for a reverse rotation does not well engage with the gear of the input shaft, and gear noises may occur.

In this respect, Japanese Patent No. 2873690, discloses a structure in which means for quickly discharging a lubricating oil is provided in the wet type clutch, thereby reducing the drag torque left at the time of disengaging the clutch and an inertia of the input shaft. Accordingly, the drag torque at the time of changing the gear is securely reduced, and an engagement of the gears for reverse rotation can be improved. However, in accordance with the structure mentioned above, there is a problem that a complex lubricating circuit for discharging the lubricating oil is required, whereby the structure of the apparatus becomes complex and large-sized. Further, it is impossible to make the drag torque zero even by the structure mentioned above, and so that is not a way to basically solve the problem.

SUMMARY OF THE INVENTION

An object of the present invention is to make it possible to securely and smoothly execute a shift operation to a reverse gear for a short time in spite of using a clutch having a drag torque.

In accordance with the present invention, there is provided a control apparatus of an automated manual transmission comprising an input shaft provided with a plurality of drive gears, an output shaft provided with a plurality of driven gears engaged with the drive gears, a reverse idler gear arranged between the input shaft and the output shaft and engaging with gears for backward movement respectively provided at the input shaft and the output shaft when a backward moving stage is selected as a drive mode of the vehicle, and a bypass clutch capable of selectively transmitting or shutting a power of the input shaft to the output shaft, wherein the bypass clutch is temporarily engaged before the reverse idler gear and the backward moving gears are engaged with each other when the backward moving stage is selected.

According to the present invention, when the backward moving stage is selected, the bypass clutch is engaged so as to restrict the rotation of the input shaft before the reverse idler gear and the backward moving gears at the input and output sides are engaged with each other, so that it is possible to restrict the rotation of the drive gear so as to smoothly engage the reverse idler gear with the backward moving gears. Accordingly, the control apparatus of the present invention can prevent the gear from failing to be properly connected and prevent the gear noise from occurring when shifting to the backward moving stage.

Further, in accordance with the present invention, there is provided a control apparatus of the automated manual transmission comprising the input shaft provided with a plurality of drive gears, the output shaft provided with the plurality of driven gears engaged with the drive gears, the reverse idler gear arranged between the input shaft and the output shaft and engaging with the gears for the backward movement respectively provided at the input shaft and the output shaft when the backward moving stage is selected as a drive mode of the vehicle, and a bypass clutch capable of selectively transmitting or shutting the power of the input shaft to the output shaft, wherein the reverse idler gear and the backward moving gears are engaged with each other after the bypass clutch is engaged to stop the rotation of the input shaft when the backward moving stage is selected.

According to the present invention, when the backward moving stage is selected, the reverse idler gear and the backward moving gears at the input and output sides are engaged with each other after the bypass clutch is engaged so as to stop the rotation of the input shaft, so that the reverse idler gear can be engaged in a state of stopping the rotation of the drive gear. Accordingly, it is possible to smoothly engage the reverse idler gear with the backward moving gears so as to prevent the gear from failing to be connected and prevent the gear noise from occurring.

Further, in accordance with the present invention, the control apparatus of the automated manual transmission allows the drive mode to change to the backward moving stage only when operating a foot brake. Accordingly, it is possible to execute a shift operation to the backward moving stage just in a state of stopping the vehicle, whereby it is possible to prevent the vehicle from forward moving due to an inertia torque of the input shaft and a drag torque of the main clutch when engaging the bypass clutch.

BRIEF DESCRIPTION OF THE DRAWINGS

The objects and advantages of the present invention will become understood from the following description with reference to the accompanying drawings, wherein:

FIG. 3 is a flow chart showing a control procedure for changing a shift to a backward moving stage in the transmission as shown in FIG. 1.

DETAILED DESCRIPTION OF THE PREFERRED EMBODIMENT

Figure 1:
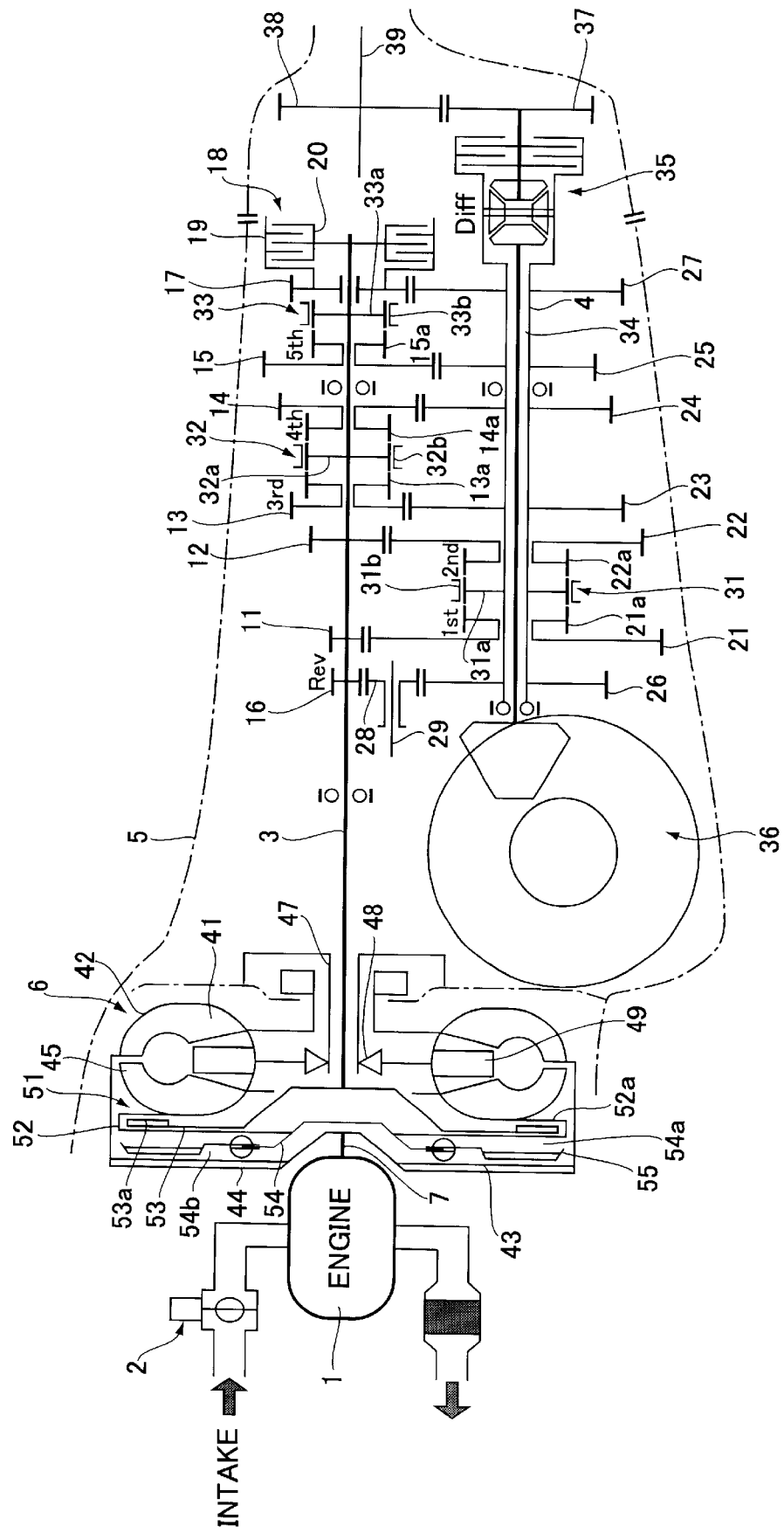
FIG. 1 is a skeleton view showing a control apparatus of a transmission in accordance with an embodiment of the present invention.

A description will be in detail given below of an embodiment in accordance with the present invention with reference to the accompanying drawings. FIG. 1 is a skeleton view showing a control apparatus of a transmission in accordance with an embodiment of the present invention.

An engine 1 as shown in FIG. 1 is provided with an electronic control throttle 2 for adjusting an engine torque and an engine speed, and normally an engine control is executed by opening and closing the electronic control throttle 2 based on an output signal from an electronic control apparatus according to a depressing amount of an accelerator pedal (not shown). Further, the electronic control throttle 2 can be opened and closed on the basis of a map previously setted in accordance with a detected operation state, without relation to the depressing amount of the accelerator pedal as mentioned above, thereby executing an engine control.

Further, longitudinally arranged in the vehicle is a power transmitting apparatus for transmitting a power generated by the engine 1 to drive wheels, which includes an input shaft 3 connected to the engine 1 and an output shaft 4 arranged in parallel to the input shaft 3 and connected to the drive wheels. All the elements are assembled within a transmission case 5 so as to be directed to a forward moving direction of the vehicle. The input shaft 3 is connected to a crankshaft 7 of the engine 1 via a torque converter 6.

First speed and second speed drive gears 11 and 12 are fixed to the input shaft 3, and third to fifth drive gears 13 to 15 are rotatably mounted thereto. First and second speed driven gears 21 and 22 are rotatably mounted to the output shaft 4, and third to fifth speed driven gears 23 to 25 are fixed thereto. The respective drive gears 11 to 15 are engaged with the corresponding driven gears 21 to 25 so as to form a transmission gear train, and the gear change operation is executed by switching the transmission gear train which transmits a power. A drive gear 16 for a backward moving is further fixed to the input shaft 3.

A first synchromesh mechanism 31 is provided between the first speed driven gear 21 and the second speed driven gear 22 of the output shaft 4. A second synchromesh mechanism 32 is provided between the third speed drive gear 13 and the fourth speed drive gear 14, and a third synchromesh mechanism 33 is provided adjacent to the fifth speed drive gear 15 of the input shaft 3.

The synchromesh mechanism 31 includes a synchro hub 31a fixed to the output shaft 4 and a synchro sleeve 31b always engaging therewith. When engaging the synchro sleeve 31b with a spline 21a integrally formed in the first speed driven gear 21, a transmission gear ratio is setted to a first speed, and on the other hand, when engaging with a spline 22a integrally formed in the second speed driven gear 22, it is setted to a second speed.

The other synchromesh mechanism 32 and 33 include synchro hubs 32a and 33a fixed to the input shaft 3 and synchro sleeves 32b and 33b respectively always engaging with them, and are respectively engaged with any of the corresponding splines 13a, 14a and 15a, whereby each transmission gear ratio is setted to a third speed to a fifth speed.

A driven gear 26 for backward moving is mounted on the output shaft 4, and a reverse idler gear 28 is provided between the drive gear 16 and the driven gear 26 so as to freely rotate with respect to an idle shaft 29. The reverse idler gear 28 is slidably attached to the idler shaft 29 so as to freely move between a position engaging with the gears 16 and 26 and a position removing from the engagement. Accordingly, when a reverse mode, i.e., a backward moving stage is selected, the reverse idler gear 28 slides in an axial direction, the drive gear 16 and the driven gear 26 are engaged with each other via the reverse idler gear 28, and the rotation of the input shaft 3 is transmitted to the output shaft 4 so as to be changed in a reverse direction. The reverse idler gear 28 and the synchromesh mechanisms 31 to 33 are structured so as to be driven by a hydraulic actuator. In this transmission, no synchromesh mechanism is provided in the gear train of the backward moving gears, but it may be provided.

The output shaft 4 is formed as a hollow shaft, a front wheel output shaft 34 is assembled in an inner portion thereof, the output shaft 4 and the front wheel output shaft 34 are connected by a center differential apparatus 35, and the front wheel output shaft 34 is connected to a drive shaft (not shown) for the front wheels via a front differential apparatus 36. Further, the center differential apparatus 35 is connected to a rear wheel output shaft 39 via a drive gear 37 and a driven gear 38, and the rear wheel output shaft 39 is connected to a drive shaft (not shown) for the rear wheels via a rear differential apparatus (not shown).

A bypass gear 17 in a drive side is rotatably mounted on the input shaft 3, and a bypass gear 27 in a driven side is fixed to the output shaft 4. The gears 17 and 27 are always engaged with each other with keeping a predetermined gear ratio. A bypass clutch 18 is provided at the input shaft 3, and the bypass clutch 18 includes a clutch hub 20 fixed to the input shaft 3 and a clutch drum 19 fixed to the bypass gear 17. The power from the input shaft 3 is transmitted to the output shaft 4 via the bypass clutch 18 by pressing a plurality of drive and driven clutch discs alternately provided in the clutch drum 19 and the clutch hub 20.

The torque converter 6 includes an outer shell 42 provided with a pump impeller 41 and a front cover 43 fixed thereto, and the front cover 43 is fixed to a drive plate 44 integrally provided with the crankshaft 7. A turbine runner 45 arranged so as to oppose to the pump impeller 41 is connected to the input shaft 3 via a start clutch, that is, an input clutch 51. The input clutch 51 includes a clutch drum 52 fixed to the turbine runner 45 and a clutch hub 53 directly connected to the input shaft 3, the latte of which is provided with a clutch disc 53a being in contact with a clutch drive disc 52a mounted in the clutch drum 52.

A lockup clutch 54, which is pressed to the front cover 43 so as to transmit an engine torque, is fitted to the input shaft 3 in such a manner as to be capable of transmitting the power. One the side of the lockup clutch 54 forms an applying chamber 54a to which a control hydraulic pressure for pressing the lockup clutch 54 to the front cover 43 is supplied, and another side forms a release chamber 54b for releasing an engagement state thereof. Further, the lockup clutch 54 is released by circulating the hydraulic oil supplied to the release chamber 54b via the applying chamber 54a, so that the torque converter 6 is in an operating state. On the other hand, the clutch disc 55 of the lockup clutch 54 is pressed to the front cover 43 to be in a lockup state, by applying the hydraulic pressure to the applying chamber 54a so as to reduce a hydraulic pressure within the release chamber 54b. The lockup clutch 54 is engaged when the vehicle speed becomes equal to or more than a predetermined value on the basis of a map of a vehicle speed, an accelerator opening degree which are previously setted in accordance with experiments.

The input clutch 51 is structured so as to be hydraulically controlled independently of a circulating fluid within the torque converter 6. Since the rotation of the turbine runner 45 is transmitted to the input shaft 3 via the input clutch 51, and on the other hand, the lockup clutch 54 is connected to the clutch drum 52, the rotation of the crankshaft 7 is transmitted to the input shaft 3 via the input clutch 51 when engaging the lockup clutch 54. Thus, the power from the crankshaft 7 is transmitted to the input shaft 3 via the torque converter 6 or the lockup clutch 5 by using the input clutch 51.

The input clutch 51 is assembled within the torque converter 6, and the end portion of the input shaft 3 is positioned at a hollow supporting shaft 47, however, the input clutch 51 may be arranged at the rear of the supporting shaft 47. In this case, an inner portion of the supporting shaft 47 at the input shaft 3 forms a turbine shaft directly connected to the turbine runner 45, and the lockup clutch 54 is fixed to the turbine shaft.

In the transmission, the gear change operation and the operation of the bypass clutch 18 and the input clutch 51 are actuated by the hydraulic pressure. Further, the gear change operation is automatically executed on the basis of the map previously setted by detecting the vehicle traveling state in accordance with the signals of the engine speed, the accelerator opening degree, the vehicle speed, the speed of the input shaft, and the gear change stage position.

Figure 2:
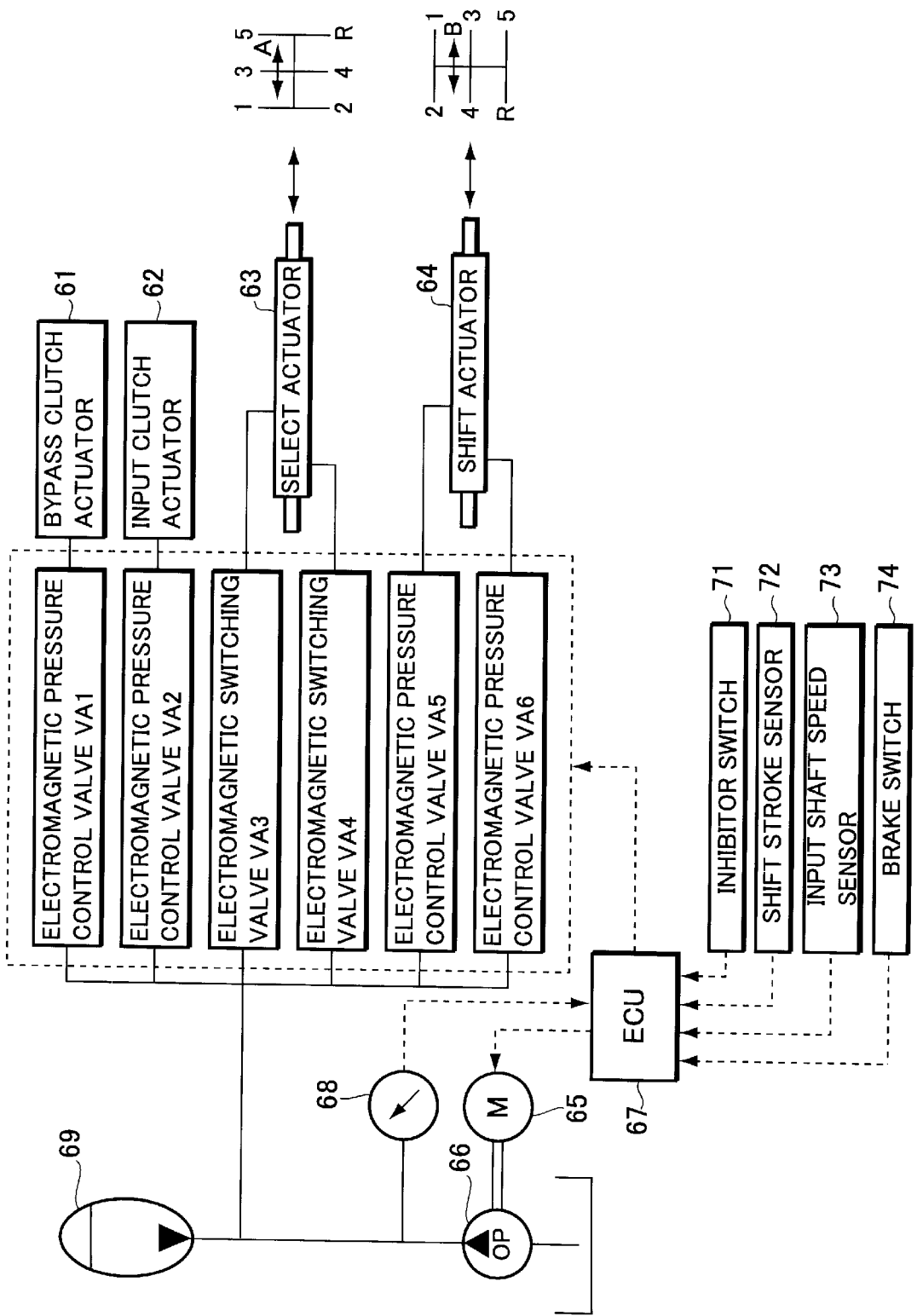
FIG. 2 is a block diagram showing an example of a hydraulic control circuit for driving the transmission as shown in FIG. 1.

FIG. 2 is a block diagram showing one embodiment of a hydraulic control circuit for controlling an operation of the automatic transmission shown in FIG. 1, and FIG. 3 is a flow chart showing a control procedure at a time of changing the shift to the backward moving stage in the automatic transmission in FIG. 1.

As shown in FIG. 2, the automatic transmission includes a bypass clutch actuator 61 for operating the bypass clutch 18 and an input clutch actuator 62 for operating the input clutch 51. Further, the automatic transmission includes a select actuator 63 and a shift actuator 64, for the purpose of switching the transmission gear pair performing a power transmission among a plurality of gear trains so as to execute the gear change operation. The transmission as shown in FIG. 1 includes totally six speed gear change stages comprising five forward moving stages and one backward moving stage, and is structured such as to transmit the respective switching movement of the select actuator 63 and the shift actuator 64 to the switching movement of the synchromesh mechanisms 31 to 33 and the reverse idler gear 28 via a direction changing mechanism (not shown).

In this transmission, a working fluid for driving various kinds of actuators is supplied by an oil pump 66 driven with an electric motor 65. The electric motor 65 is controlled by an electronic control unit (hereinafter, referred to as ECU) 67, and a discharge pressure (a line pressure) from the oil pump 66 is monitored by a pressure sensor 68.

Signals are input to the ECU 67 from an inhibitor switch 71, a shift stroke sensor 72, an input shaft speed sensor 73, and a brake switch 74. Accordingly, the ECU 67 detects a position of a select lever operated by the driver on the basis of signals from an inhibitor switch 71 and a shift stroke sensor 72. Further, the speed of the input shaft 3 is detected by an input shaft speed sensor 73, and whether or not the driver operates (pedals) the foot brake is detected by the brake switch 74. Further, the ECU 67 judges an operation state of the vehicle on the basis of the detected data, outputs a driving signal to the electric motor 65 as occasion demands, and controls to drive the respective actuators via a hydraulic system.

Further, the ECU 67 always monitors the line pressure supplied from the oil pump 66 by the pressure sensor 68, and stops the electric motor 65 in the case that the hydraulic pressure becomes equal to or more than a predetermined value. Thereafter, when the hydraulic pressure decreases by the repeated gear change operations and the line pressure becomes equal to or less than a predetermined value, the electric motor 65 is re-started.

A part of the working fluid supplied from the oil pump 66 is stored in an accumulator 69, as shown in FIG. 2. In this case, a sealed container of the accumulator 69 is filled with a gas such as a nitrogen, and so the gas is compressed by pressing the working fluid thereto, so that a pressure energy of the working fluid can be converted into a pressure energy of the gas to be stored. That is, the line pressure is stored in the accumulator 69, thereby stabilizing the line pressure. Further, even in the case that a trouble in the hydraulic system such as a trouble in the pump, an oil leakage and the like is generated, a minimum emergency operation such as forcibly changing the gear change stage, for example, to a third speed, can be secured by the stored pressure in the accumulator 69.

The working fluid is supplied to various kinds of hydraulically operated equipment via an electromagnetic control valve constituted by a three-way type valve. That is, the working fluid is supplied to the bypass clutch actuator 61 via an electromagnetic pressure control valve VA1 and to the input clutch actuator 62 via an electromagnetic pressure control valve VA2, from the oil pump 66, respectively. Further, the working fluid is supplied to the select actuator 63 via electromagnetic switching valves VA3 and VA4, and to the shift actuator 64 via electromagnetic pressure control valves VA5 and VA6. Further, the structure is made such that the select lever position is moved in a direction of an arrow A shown in FIG. 2 by controlling the electromagnetic switching valves VA3 and VA4 so as to drive the select actuator 63, and the select lever position is moved in a direction of an arrow B by controlling the electromagnetic pressure control valves VA5 and VA6 so as to drive the shift actuator 64.

In this case, the select actuator 63 is controlled by the electromagnetic switching valves VA3, VA4, while the shift actuator 64 is controlled by the electromagnetic pressure control valve, because a two-position switching operation (a selecting operation) in the A direction can be sufficiently executed by simply pressing by a large operating force until striking against a dead stop, while a three-position switching operation (a shift operation) in the B direction requires a synchronism by the synchronous mechanism. Since an excessive operating force causes an abrasion of a synchro-ring thereof, it is desired to control the operating force itself. Further, since the shift operating force in the B direction is larger than the select operating force in the A direction, loud noises occur at a time of being brought into contact with the dead stop, so that a countermeasure against operating noises is required. Accordingly, in the shift operation, an operation period is divided into three stages by the shift actuator 64, thereby satisfying requirements comprising a rapid shift operation, a protection of the synchro ring and a reduction of the operating noises. That is, the operating force is adjusted so as to be strong at an initial period, middle at a synchronous period and weak at a terminal period. Accordingly, as the shift actuator 64, an electromagnetic pressure control valve capable of adjusting a supplied hydraulic pressure is used in place of the control valve simply executing only on and off operation of the hydraulic pressure.

In this case, the working fluid from the oil pump 66 is converted into a predetermined hydraulic pressure so as to be supplied to the torque converter 6, the lockup clutch 54, and the respective lubricating portion. Further, in the present embodiment, the oil pump 66 is driven by the motor, but may be driven by the engine 1 via the torque converter 6 in place thereof.

Next, a description will be given of a shift change operation in the transmission in FIG. 1. The shift change operation is controlled by the ECU 67. At first, when a neutral position is selected by the select lever provided within the vehicle compartment in a state where the engine is driven, both of the lockup clutch 54 and the input clutch 51 are setted in a released state.

When the forward moving stage is selected by the select lever, the ECU 67 controls the electromagnetic pressure control valve VA2 so as to supply the hydraulic pressure to the input clutch 51, so that the input clutch 51 is in a contact state due to the hydraulic pressure. At this time, in accordance with a priority order of the operation of the input clutch 51, at first, the synchro sleeve 31b is engaged with the spline 21a by the shift actuator 64 so as to achieve that the first speed transmission gear train becomes in the power transmitting state and thereafter the hydraulic pressure is applied so as to engage the input clutch 51. Accordingly, the power of the engine 1 is transmitted to the input shaft 3 via the torque converter 6 and the input clutch 51, so that the vehicle can travel. At this time, the power is amplified due to a torque amplifying effect of the torque converter 6 so as to be transmitted to the input shaft 3.

In accordance with an increase of the accelerator opening degree, the electronic control throttle 2 is opened, and thus, according to an increase of the vehicle speed, the up shift gear change operation is executed. Also, the down shift gear change operation is executed in accordance with a reduction of the vehicle speed or a kick-down operation of deeply depressing the accelerator pedal. At this time, the shift change is automatically executed in accordance with a gear change pattern previously programmed in the ECU 67.

When the up shift operation is executed, the engagement of the bypass clutch 18 is started with maintaining the input clutch 51 in a lock-up state, wherein the control is executed so as to gradually increase a transmitting torque capacity of the bypass clutch 18. Accordingly, for example, at a time of changing the shift from the first speed to the second speed, the engine speed is reduced to a predetermined speed corresponding to the second speed gear ratio by the electronic control throttle 2 so as to be synchronized at the same time as gradually increasing the transmitting torque capacity of the bypass clutch 18 while engaging the input clutch 51, whereby the synchro sleeve 31b is engaged with the spline 22a of the second speed driven gear 22. Since, at this time, the power is transmitted from the input shaft 3 to the output shaft 4 via the bypass gears 17 and 27 in the drive and driven sides in accordance with the engagement of the bypass clutch 18, and thus the power from the engine 1 is not shut down, it can prevent the torque from declining at a time of changing gear.

On the other hand, when the backward moving stage is selected by the select lever, at fist, it is judged in a step S1 whether or not the select lever is at a reverse position, as shown in FIG. 3. When it is confirmed that it is at the reverse position, the step goes to a step S2, and it is detected whether or not the foot brake is turned on, that is, the brake is stepped on. At this time, when the foot brake is not stepped on, the confirmation in the step S2 is repeated, and the step goes to the following steps only when the brake pedal is stepped on. That is, it is setted so that the switching operation to the reverse position is executed only when it is confirmed that the brake is stepped on. The confirmation whether or not the brake is stepped on is executed for the purpose of preventing the vehicle from moving forward when the bypass clutch 18 is later engaged.

In the case that the foot brake ON is confirmed, the step goes to a step S3, the electromagnetic pressure control valve VA1 is opened so as to increase the hydraulic pressure to the bypass clutch actuator 61, thereby engaging the bypass clutch 18. That is, in this transmission, before engaging the reverse idler gear 28 so as to switch to the reverse mode, at first, the bypass clutch 18 is temporarily engaged. Accordingly, the output shaft 4 and the input shaft 3 under the stop state are connected, and the rotation of the input shaft 3 is restricted.

Then, after engaging the bypass clutch 18, the step goes to a step S4, wherein it is detected whether or not the rotation of the input shaft 3 is stopped. That is, the state of the input shaft 3 is detected on the basis of the data of the input shaft speed sensor 73. Further, in the case that the rotation stop is confirmed, the step goes to a step S5, wherein a switching operation to the reverse mode is started. On the other hand, in the case that the rotation of the input shaft 3 is not stopped, the engagement of the bypass clutch 18 is continued until the stop is confirmed.

In the step S5, the switching operation to the reverse mode is executed by outputting the control signal from the ECU 67 to the electromagnetic valves VA3 to 6 and driving the select actuator 63 and the shift actuator 64. In this case, at first, in order to drive the select actuator 63, the electromagnetic switching valve VA4 is opened so as to apply the hydraulic pressure to one of the oil chambers, and also the electromagnetic switching valve VA3 is switched so as to drain the oil into another oil chamber. Next, in order to drive the shift actuator 64, the electromagnetic pressure control valve VA5 is opened so as to supply the hydraulic pressure to one of oil chambers, and also the electromagnetic pressure control valve VA6 is switched so as to drain the oil in another oil chamber. Accordingly, the reverse idler gear 28 moves in an axial direction, whereby the drive gear 16 and the driven gear 26 are engaged with each other via the reverse idler gear 28. In this case, since the rotation of the input shaft 3 is made under the stop state in the steps S3 and S4 prior to the movement of the reverse idler gear 28, it is possible to easily engage the drive gear 16 with the reverse idler gear 28.

After switching to the reverse mode in a step 5, the step goes to a step S6, wherein the engagement of the bypass clutch 18 is cancelled. That is, the oil is drained from the electromagnetic pressure control valve VA1 so as to reduce the hydraulic pressure and release the bypass clutch 18, thereby making the output shaft 4 capable of reversely rotating. Further, it is detected in a step S7 on the basis of the signal from the shift stroke sensor 72 whether or not the switching operation to the reverse mode is completed. In the case that the shift completion is confirmed, the step goes to a step S8 so as to engage the input clutch 51. On the other hand, in the case that the switching operation to the reverse mode is not completed, the step goes back to the step S5, whereby the shift change is continued.

In the transmission shown in FIG. 1, when the backward moving stage is selected by operating the select lever, the bypass clutch 18 is engaged so as to restrict the rotation of the input shaft 3, prior to the engagement between the reverse idler gear 28 and the backward moving gear. Accordingly, it is possible to engage the reverse idler gear 28 in a state of stopping the rotation of the drive gear 16, so that it can prevent the reverse idler 28 from failing to be engaged, and prevent the gear noises from occurring, whereby it is possible to quickly change the shift to the backward moving stage.

It should be clearly understood that the present invention is not limited to the embodiment mentioned above, and can be variously modified within a range of the scope of the present invention.

For example, the control for temporarily engaging the bypass clutch 18 before changing the shift as shown in FIG. 3 may be applied also to shifting from the neutral position to the forward moving stage in addition to the switching operation to the reverse mode. Thereby, it is possible to reduce a load applied to the synchromesh mechanism, and to improve a durability of the apparatus. Further, the bypass clutch 18 is provided at the input shaft 3, but may be provided at the output shaft 4, or at the intermediate shaft independently located in parallel to the both. Further, the bypass gears 17 and 27 are setted to the gear ratio corresponding to the third speed, but may be a gear ratio corresponding to a fourth speed or a fifth speed. As the switching mechanism of the transmission gear ratio, the synchromesh mechanisms 31 to 33 are used, but, the structure is not limited to them, and a dog clutch switching or the like may be employed.

In the case of the present embodiment, the number of the gear change stages is setted to the forward moving five stages, but, the number of the gear change stages may be setted to an optional number. Further, the present invention may be applied to the transmission having an auxiliary transmission. The transmission shown in FIG. 1 is for the four-wheel drive vehicle, but the present invention may be also applied to an FF vehicle or an FR vehicle. Further, the transmission shown in FIG. 1 is of the longitudinal-arranged type, but the present invention may be also applied to a horizontal-arranged type in which the input shaft and the output shaft are directed in a lateral direction.

According to the present invention, when the backward moving stage is selected, the bypass clutch is engaged so as to restrict the rotation of the input shaft prior to the engagement between the reverse idler gear and the input and output backward moving gears, so that the reverse idler gear can be smoothly engaged with the backward moving gear while restricting the rotation of the drive gear. Accordingly, it is possible to prevent the gears from failing to be engaged and the gear noises from occurring.

Further, in accordance with the present invention, since the shift operation to the backward moving stage is allowed only when the foot brake is stepped on, it is possible to prevent the vehicle from moving forward due to the engagement of the bypass clutch.

While there have been described what are at present considered to be preferred embodiments of the present invention, as already mentioned above, it will be understood that various modifications may be made thereto, and it is intended that the appended claims cover all such modifications as fall within the true spirit and scope of the invention.

What is claimed is:

1. An automated manual transmission, comprising:

an input shaft provided with a drive gear;

an output shaft provided with a driven gear engaged with said drive gear;

a reverse idler gear arranged between said input shaft and said output shaft;

a bypass clutch capable of temporarily transmitting power from said input shaft to said output shaft or vice versa only during a shifting operation; and a control unit adapted to selectively engage said bypass clutch until a rotation of said input shaft stops before engaging said reverse idler gear.

2. The automated manual transmission according to claim 1, wherein said control unit allows said reverse idler gear to connect said input shaft to said output shaft only when operating a foot brake, and wherein one of said drive gear and said driven gear directly engages a corresponding one of said input shaft and said output shaft and wherein the other of said drive gear and said driven gear is directly engageable with the corresponding other of said input shaft and said output shaft.

3. An automated manual transmission, comprising:

an input shaft provided with a drive gear;

an output shaft provided with a driven gear engaged with said drive gear;

a reverse idler gear arranged between said input shaft and said output shaft;

a bypass clutch capable of temporarily transmitting power from said input shaft to said output shaft or vice versa only during a shifting operation; and a control unit adapted to engage said reverse idler gear after said bypass clutch is engaged to stop the rotation of said input shaft.

4. The automated manual transmission according to claim 3, wherein said control unit allows said reverse idler gear to connect said input shaft to said output shaft only when operating a foot brake.

5. An automated manual transmission, comprising:

an input shaft including a reverse drive gear;

an output shaft provided with a reverse driven gear;

a reverse idler gear adapted to selectively engage said reverse drive gear to said reverse driven gear;

a bypass clutch capable of temporarily transmitting power from said input shaft to said output shaft or vice versa only during a shifting operation; and a control unit adapted to selectively engage said bypass clutch until a rotation of said input shaft stops before selectively engaging said reverse idler gear with both said reverse drive gear and said reverse driven gear.

6. The transmission of claim 5, further comprising a torque converter between a crankshaft of an engine and said input shaft.

7. The transmission of claim 6, further comprising an input clutch between a turbine runner of said torque converter and said input shaft.

8. The transmission of claim 7, wherein said control unit is further adapted to selectively engage said input clutch.

9. The transmission of claim 5, wherein said control unit requires a brake signal to selectively engage said reverse idler gear.

10. The transmission of claim 9, further comprising an input shaft speed sensor coupled to said input shaft.

11. The transmission of claim 10, wherein said control unit further requires a signal from said input shaft speed sensor that indicates said input shaft is not rotating to selectively engage said reverse idler gear.

12. The transmission of claim 5, further comprising a first bypass gear connecting said bypass clutch to one of said input shaft and said output shaft while said bypass clutch is connected to the other of said input shaft and said output shaft.

13. The transmission of claim 12, further comprising a second bypass gear connecting said first bypass gear to said one of said input shaft and said output shaft.

14. The transmission of claim 5, further comprising:

a plurality of drive gears on said input shaft; and a plurality of driven gears on said output shaft, wherein each of said drive gears is selectively engageable to a corresponding one of said driven gears.

15. The transmission of claim 5, wherein said reverse idler gear slides in an axial direction thereof to engage said reverse drive gear and said reverse driven gear when a reverse mode is selected.

16. A method of engaging a reverse drive gear on an input shaft with a reverse driven gear on an output shaft in an automated manual transmission, the method comprising:

determining if a brake signal is received;

engaging a bypass clutch to engage said input shaft to said output shaft only if said brake signal is received;

detecting a rotational speed of said input shaft; and engaging said reverse drive gear with said reverse driven gear if said input shaft has a predetermined rotational speed or less.

17. An automated manual transmission, comprising:

an input shaft provided with a forward drive gear, a reverse drive gear and a bypass drive gear;

an output shaft provided with a forward driven gear, a reverse driven gear and a bypass driven gear engaged with said bypass drive gear;

a gear ratio change mechanism for selectively engaging the input shaft to the output shaft via said forward drive gear and said forward driven gear;

a reverse idler gear for selectively engaging said input shaft to said output shaft via said reverse drive gear and said reverse driven gear;

a bypass clutch for selectively engaging said input shaft to said output shaft via the bypass drive gear and the bypass driven gear; and a control unit for only temporarily engaging said bypass clutch during one of a shifting operation that engages said reverse idler gear and a shifting operation that engages the input shaft to the output shaft via said forward drive gear and said forward driven gear.

* * * * *